INVENTORS
OSKAR ECKERT
GEORG ZERBES
BY Greene, Pineles & Durr
ATTORNEYS

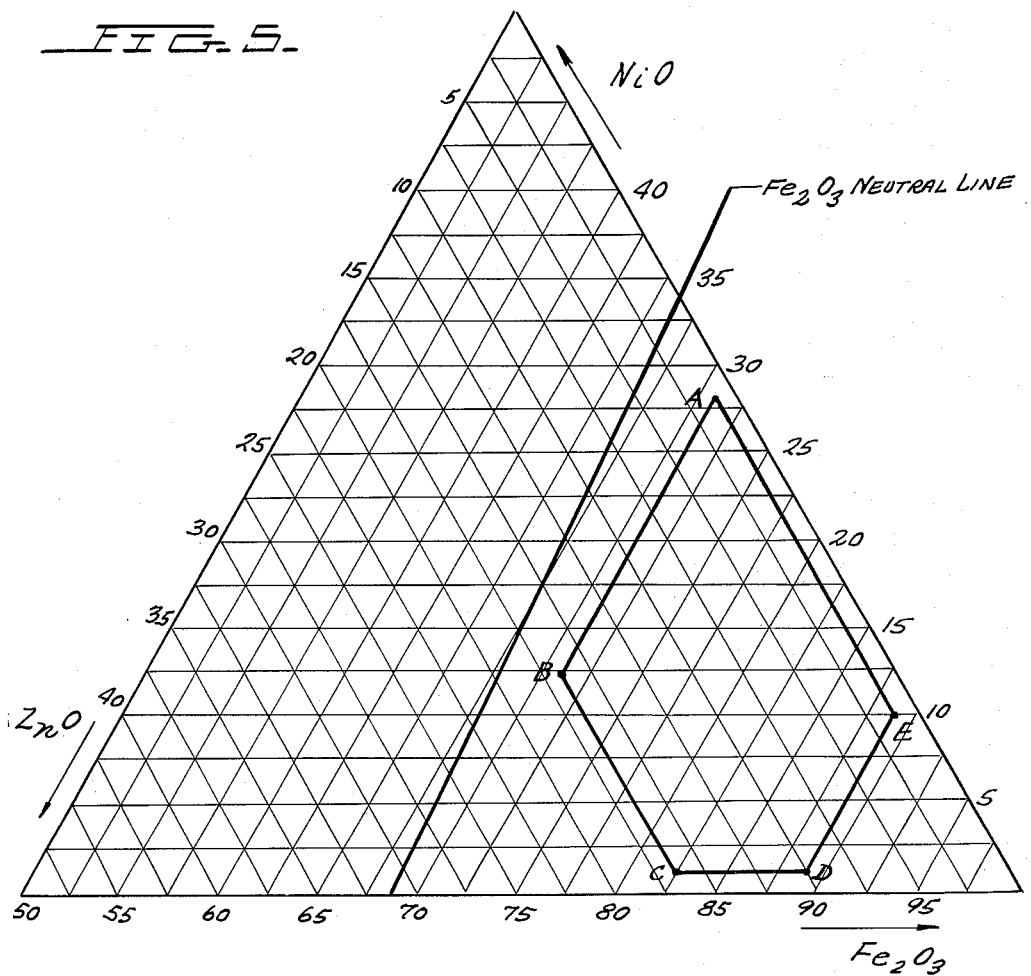
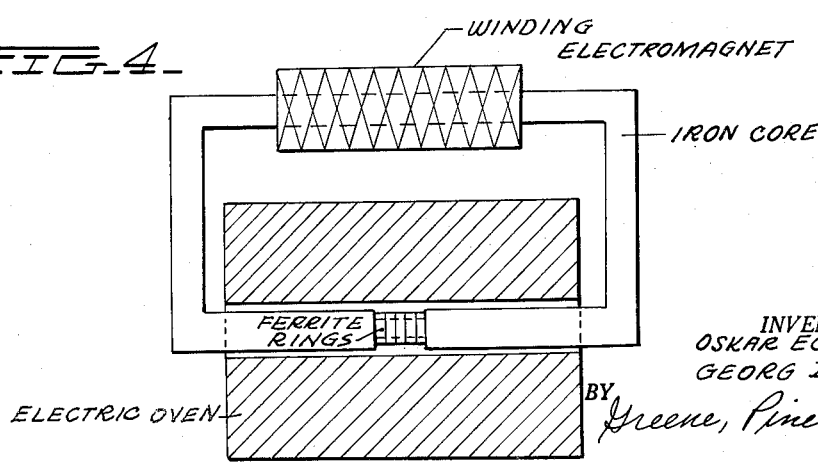

United States Patent Office
2,989,475
Patented June 20, 1961

2,989,475
FERRITE OF FIELD INDEPENDENT PERMEABILITY
Oskar Eckert, Lauf (Pegnitz), and Georg Zerbes, Solingen, Germany, assignors to Steatit-Magnesia Aktiengesellschaft, Lauf (Pegnitz), Germany, a corporation of Germany
Filed Oct. 22, 1956, Ser. No. 617,463
Claims priority, application Germany Oct. 25, 1955
5 Claims. (Cl. 252—62.5)

U.S. Patent application Serial No. 467,828 filed November 9, 1954 (now abandoned in favor of U.S. applications Serial Nos. 754,371 and 754,372 filed August 11, 1958) describes a ferrite system which is distinguished from those known in the previous art in that it contains additional small quantities of CoO, with or without MnO, which additives produce the effect that magnetic cores, made of the indicated ferrite system, for example antenna rods, have a specially high quality (Q) factor for high frequency.

Said application of which one of the present applicants is the inventor incloses a nickel-zinc-ferrite containing 2.5 to 40% by weight of nickel oxide, 2.5 to 40% by weight of zinc oxide, and 57.5 to 80% by weight of ferric oxide to which is added 1–60% by weight of cobalt oxide (CoO) based on the amount of nickel oxide present, the total amount of CoO added being between 0.1 and 3% by weight of the total weight of the composition. Particularly good results are obtained when up to 5% by weight of MnO is also added.

Figure 1:
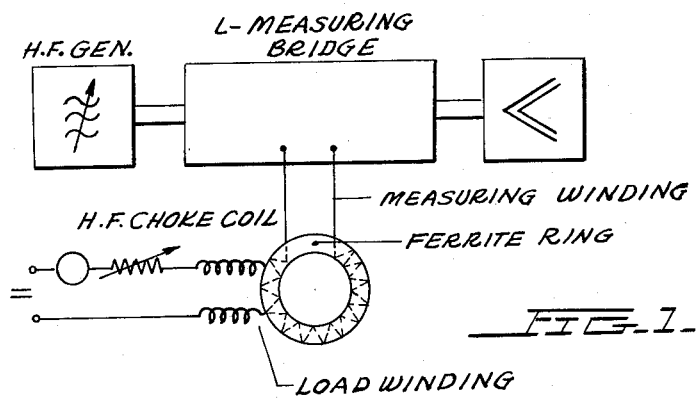
Figure 2:
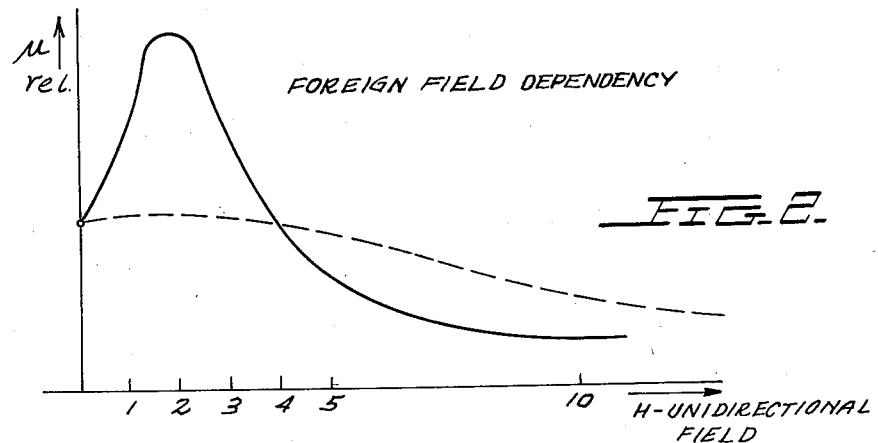
Figure 3:
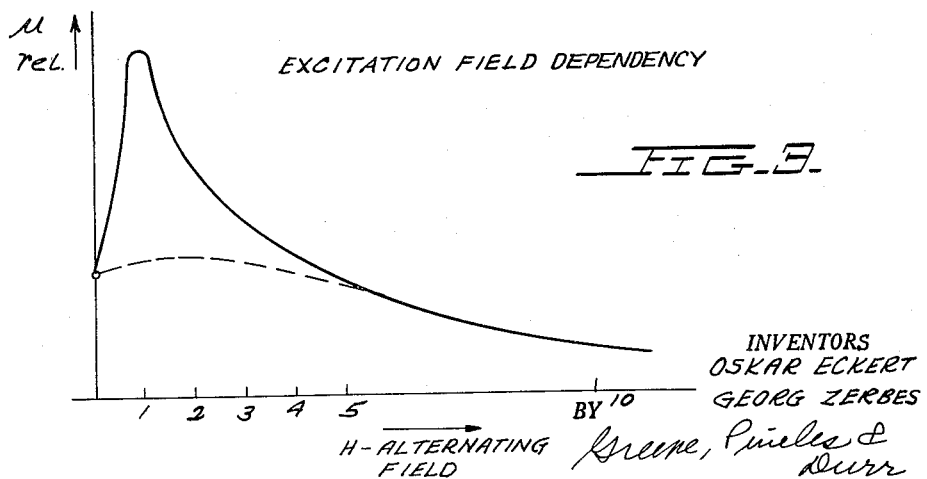

In the drawing:
FIG. 1 shows an apparatus for testing the effect of stray fields on ferrite rings.
FIG. 2 is a graph showing in a qualitative way how the permeability of an untreated ferrite and a ferrite treated according to the present invention respond in the presence of a stray unidirectional magnetic field.
FIG. 3 is a graph showing in a qualitative way how the permeability of an untreated ferrite and a ferrite treated according to the present invention respond as a function of the strength of the exciting field.
FIG. 4 is a diagram of an apparatus suitable for applying the treatment of the present invention.
FIG. 5 is a triaxial diagram of weight percent, outlining an area which includes the proportions of zinc oxide, nickel oxide and ferric oxide in ferrites to which the treatment of the invention is applicable.

A disadvantage of all ferrites of the prior art, including those of the above-identified application, although to a lesser degree, is that such ferrites display a rather distinct dependency of the permeability on external and internal fields. By this is meant the following:

(a) Stray field sensitivity: If a ring of ferrite material, as shown in FIGURE 1, is exposed to a magnetic field, produced by direct current, and, as a function thereof, its permeability is measured in an alternating current measuring bridge at small field strengths, one obtains curves such as shown in the solid line in FIGURE 2.

This shows that the permeability is first undesirably increased and then strongly reduced.

This effect occurs in practice with ferrites of the prior art when, for example, the ferrite rod of a ferrite antenna is turned in the apparatus housing for tuning and thereby alters its position relative to the magnetic field of the loudspeaker.

It has been attempted to reduce this undesirable influence of stray fields by affixing to the front surface of the ferrite rod small discs of a permanent-magnetic material, for instance, barium ferrite.

(b) Dependency of permeability on excitation intensity (internal field sensitivity). If the permeability of a ferrite ring core is measured as a function of the alternating field amplitude of the exciting measuring field, the ferrites heretofore used, yield curves such as shown in FIGURE 3, for example.

This self field dependency is also undesirable and has hitherto limited the application of ferrite-high frequency-transformers and transmitters to low alternating field amplitudes.

The internal field sensitivity also interferes if the energy coming on the ferrite antenna from the radio transmitter changes with time or with varying atmospheric conditions.

This invention discloses a method by which the internal or external field sensitivity may be completely suppressed in the ferrites of the application described above.

In the experiments with the ferrites of the said prior patent application, it has surprisingly been found that the field dependency of permeability is considerably reduced if such ferrites are subjected to a thermomagnetic treatment process as described below (FIGURE 4).

A pile of ring cores which have a composition of the type claimed in the said prior application, is heated in a kiln to 150° above its Curie point. During this operation, the ring core pile is placed between the poles of an electromagnet having an iron yoke of a material with a Curie point of 600°; now, by means of a direct current flowing through the winding of the electromagnet during the heating and cooling, or at least during the cooling-off period from the above indicated temperature to room temperature, a magnetic field, at right angles with respect to the ring plane, and hence at right angles to the latter direction of measurement, is maintained for example at a strength of at least 10 ampere turns per centimeter. Care should be taken that the cooling-off of the ring from the temperature ($T_c$ plus 150° C.) to room temperature extends over a period of not less than 12 hours. Ring cores thus treated are taken out of the apparatus after cooling to room temperature and provided with a winding of 0.4 mm. copper-enameled wire, the ring winding depending on the desired operating frequency range.

Thereupon, the stray field and excitation field dependency of the permeability is measured, as described, and the results are shown in FIGS. 2 and 3 by the dotted curves; in relation to the non-thermical cross-field-magnetized core, they show a considerably reduced dependency of the permeability on the internal or external fields. Without restricting the inventive idea, the maintenance of the magnetic field during the thermic treatment may also be effected by suitable permanent-magnetic materials. Of course, the method is in no way restricted to the shape of the ring core. For other forms of cores, one needs only select the pole of the electromagnet, or the form of the permanent magnet, in such a way that a magnetizing field, perpendicular to the later measuring field, is maintained during the thermic treating cycle.

In accordance with the present invention, preferably ferrites of more than 50 mol percent $Fe_2O_3$ are adaptable to the above described thermo-magnetic treatment. Further, according to the invention, the thermomagnetic treatment of the above described type may be applied, with favorable results, to ferrites which are above the upper limit of 80% by weight $Fe_2O_3$ as given in said prior application, namely, up to 89% by weight $Fe_2O_3$, as shown in FIG. 5, to essentially decrease the external (stray) and internal (excitation) field dependency of the permeability.

The process of the present invention makes possible the production of nickel-zinc-ferrites containing small proportions of cobalt oxide and nickel-zinc-ferrites containing small proportions of cobalt oxide and manganese oxide which are substantially independent of foreign field disturbances and excitation field variations, and are useful, for example, for high-frequency transmitters, high frequency transformers, Pupincoils, antenna rods, etc., in which the permeability is practically constant over the entire operating range.

We claim:

1. A process for improving the foreign field dependency and excitation field dependency response of a fired nickel-zinc-ferrite core body having a ring plane containing 71 to 89% by weight of ferric oxide, 1 to 28% by weight of nickel oxide, and 1 to 16.5% by weight of zinc oxide plus 0.1 to 3% by weight of cobalt oxide and 0 to 5% by weight of manganese oxide comprising heating the said ferrite body above its Curie point and cooling the body to room temperature over a period of at least about 12 hours while subjecting the same to a unidirectional magnetic field applied at right angles with respect to the ring plane of said core body.

2. A process as defined in claim 1 wherein said unidirectional magnetic field is an electromagnetic field with a strength of at least 10 ampere turns per centimeter.

3. A process as defined in claim 1 wherein the core body is heated to about 150° C. above the Curie point.

4. A process as defined in claim 1 wherein the magnetic field is applied also during the heating treatment.

5. A fired ferrite body of the nickel-zinc-ferrite system containing 71 to 89% by weight of ferric oxide, 1 to 28% by weight of nickel oxide, and 1 to 16.5% by weight of zinc oxide plus an addition of 0.1 to 3% by weight of cobalt oxide and up to 5% by weight of manganese oxide, said body having a permeability which is independent of cross field magnetization, said fired ferrite having been treated by the process of claim 1.

References Cited in the file of this patent

UNITED STATES PATENTS

| | | |
|---|---|---|
| 2,064,773 | Vogt | Dec. 15, 1936 |
| 2,723,239 | Harvey | Nov. 2, 1955 |
| 2,730,681 | Went et al. | Jan. 10, 1956 |
| 2,736,708 | Crowley et al. | Feb. 28, 1956 |
| 2,762,778 | Gorter et al. | Sept. 11, 1956 |
| 2,825,670 | Adams et al. | Mar. 4, 1958 |
| 2,827,437 | Rathenau | Mar. 18, 1958 |
| 2,882,234 | Gorter et al. | Apr. 14, 1959 |
| 2,882,235 | Gorter et al. | Apr. 14, 1959 |

FOREIGN PATENTS

| | | |
|---|---|---|
| 751,623 | Great Britain | July 4, 1956 |
| 1,115,324 | France | Dec. 26, 1955 |

OTHER REFERENCES

Magnetic Materials in the Electrical Industry, by Bardell, page 55, pub. by Philosophical Lib. Inc., New York (1955).